United States Patent [19]

Seki et al.

[11] 4,221,621

[45] Sep. 9, 1980

[54] PROCESS FOR PREPARING A FOAMED ARTICLE OF THERMOPLASTIC RESIN AND A DIE THEREFOR

[75] Inventors: Tatsujiro Seki, Funabashi; Motoji Fujii; Motoshige Hayashi, both of Nara; Masahiro Tsubone, Koga, all of Japan

[73] Assignee: Sekisui Kaseihin Kogyo Kabushiki Kaisha, Nara, Japan

[21] Appl. No.: 940,893

[22] Filed: Sep. 11, 1978

Related U.S. Application Data

[63] Continuation of Ser. No. 794,314, May 5, 1977, abandoned.

[30] Foreign Application Priority Data

May 12, 1976 [JP] Japan ................................. 51-54695

[51] Int. Cl.² .................... B29D 27/00; B32B 5/20
[52] U.S. Cl. ..................................... 156/78; 156/167; 156/498; 156/500; 264/45.5; 264/46.1; 264/51; 264/171; 425/325; 425/464; 425/378 R; 425/382 R; 425/817 C

[58] Field of Search .................. 156/500, 78, 79, 181, 156/167, 498, 244.11, 244.12; 264/45.4, 45.9, 46.1, 176 R, 176 F, 515; 425/66, 464, 378 R, 378 S, 325, 817, 382.2

[56] References Cited

U.S. PATENT DOCUMENTS

| | | | |
|---|---|---|---|
| 3,720,572 | 3/1973 | Soda et al. | 264/321 |
| 3,936,518 | 2/1976 | Soda et al. | 264/46.1 |
| 3,993,721 | 11/1976 | Soda et al. | 264/45.9 |

Primary Examiner—Michael W. Ball
Attorney, Agent, or Firm—Armstrong, Nikaido, Marmelstein & Kubovcik

[57] ABSTRACT

A process and die are disclosed for preparing a foamed article of thermoplastic resin having a particular cross section configuration. The die of the invention is provided with a plurality of apertures in its face through which the resin is discharged. The apertures in the face of the die are distributed in a shape corresponding to the cross section of the foamed article which is produced. The apertures are further divided into a plurality of groups in which there is at least one zone which is void of apertures so that the apertures in the same group are actually restricted to a narrow band. The zone on the surface of the die which is void of apertures has a thickness more than twice the average distance between two adjacent apertures belonging to the same group.

2 Claims, 13 Drawing Figures

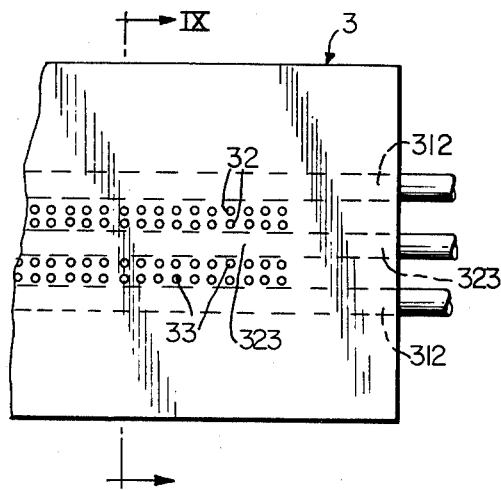
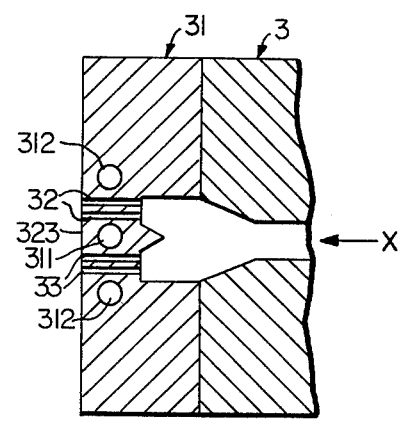
FIG. 8  FIG. 9
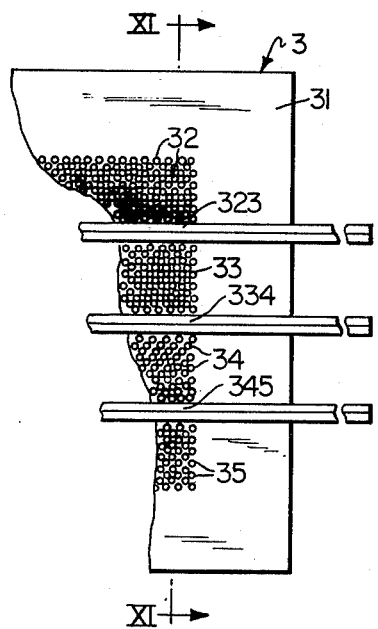
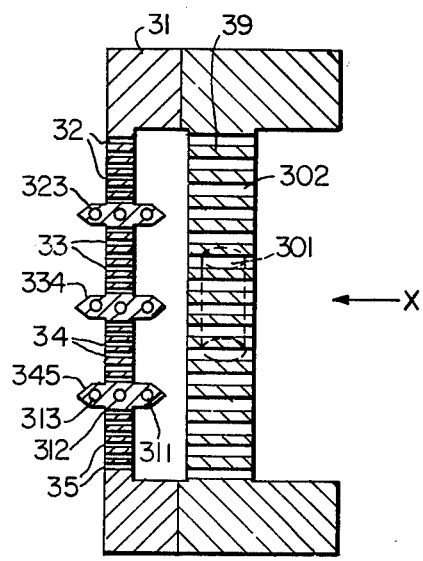
FIG. 10  FIG. 11

PROCESS FOR PREPARING A FOAMED ARTICLE OF THERMOPLASTIC RESIN AND A DIE THEREFOR

This is a continuation of application Ser. No. 794,314, filed May 5, 1977, abandoned.

BACKGROUND OF THE INVENTION

This invention relates to a process for preparing a foamed article of thermoplastic resin and also to a die for preparing the same.

It is known in the art that a foamed article having a given shape in cross section, such as a sheet, tube and the like, can be prepared by mounting a die on an extruder and extruding through the die a thermoplastic resin containing a foaming agent. Further, it is also known that a foamed article is prepared by using a die having a resin discharge face provided with a number of apertures, extruding a foamable resin through the apertures to form a corresponding number of strands, gathering the strands in a parallel relation while the strands are still in a softened state, and coalescing the strands to form an intergrated article. Japanese Patent Publication No. 35-10518 and U.S. Pat. No. 3,121,130 disclose processes for preparing a uniformly foamed article by distributing the apertures uniformly on the resin discharge face of the die. Furthermore, Japanese Patent Publication Nos. 47-40293, 47-40294 and 47-51945 disclose processes for preparing a foamed article having different density portions, either by distributing the apertures non-uniformly in the forward face of the die, or by allowing the resin to flow non-uniformly through the apertures, or by restricting the spaces wherein foamable resin strands can be foamed to form expanded strands having different densities.

These processes are suited for preparing a product having a small thickness such as a sheet. The processes are also suited for preparing a tube having a small thickness. However, if the processes are used for preparing a product having a circular or square cross section of more than 20 mm in diameter or side length, great difficulty is encountered in that the product contains sporadic holes between the foamed resin strands constituting the product. In other words, when it is intended to obtain a product having a large thickness, the individual strands can be foamed as desired according to the processes, however, it is difficult to fuse or coalesce the strands together, and, as a result, the sporadic holes are produced between the strands.

The inventors tried to eliminate the holes formed between the strands and to obtain a foamed article of a large thickness having no holes, or no hollow portions between the coalesced strands. The inventors believed that the holes were formed by the foaming agent, which was at first contained in the resin strands and then evaporated from the strands when the strands were coalesced together. The inventors also believed that the holes were caused by an insufficient coalescing force when a number of resin strands are coalesced together. In other words, the holes were formed by an insufficient pressing force which is exerted from the outside when the resin strands were coalesced. As a result, the inventors tried to increase the pressing force and to coalesce the resin strands with a larger force, but found that this only lead to a decrease in the degree of expansion of the foamed article and did not result in eliminating the holes. Furthermore, the inventors tried various other experiments, but could not eliminate the holes.

SUMMARY OF THE INVENTION

The inventors then had a chance to prepare a specific die and to try to extrude a foamable resin through the die to prepare a foamed article. The die used herein has a front surface wherein a zone having no apertures is formed between extrusion apertures perforated in the die. More particularly, the die is identical with the conventional dies in the respect that a number of apertures are perforated and opened in the resin discharge face of the die. The specific die, however, is different from the conventional dies in that the apertures are divided into a plurality of groups; that a zone having no apertures is formed between the groups, in each of which the apertures are distributed in the same manner as those in a conventional mold for preparing a thin sheet and that the zone is extended from a side to an opposite side and has about three times the width of the average distance between the apertures in each of the groups. As a result of tests in which said die is used, it was found that a foamed article of a large thickness can be obtained which has no hollow portion therein, so long as said die is used for extruding a number of strands from the apertures in the die and coalescing them to form the foamed article. This invention has been made on the basis of the above findings.

DETAILED DESCRIPTION OF THE INVENTION

According to one aspect of this invention there is provided a process for preparing a foamed article of thermoplastic resin, which comprises mounting a die on the forward end of an extruder, said die having a number of apertures on the resin discharge face of the die so that the apertures are distributed in an area corresponding to the cross-sectional shape of a desired product, extruding a molten foamable thermoplastic resin through the apertures in the die to form a corresponding number of resin strands, dividing all the strands into a plurality of groups to form spaces between the groups immediately after the resin strands have left the resin discharge face, contacting the spaces with ambient atmosphere, and thereafter coalescing the resin strands to form an integrated product while the strands are still in a softened state.

According to another aspect of the present invention, a die for preparing a foamed article of thermoplastic resin is provided which comprises a number of apertures perforated in the resin discharge face of the die, the apertures being distributed in a shaped corresponding to the cross section configuration of the desired product, the apertures being divided into a plurality of groups by at least a zone having no apertures so that the apertures belonging to the same group are restricted with a narrow band area, giving the zone with no apertures a thickness more than twice the average distance between two adjacent apertures belonging to the same group, and extending both ends of the zone to a line connecting the outer-most apertures.

BRIEF DESCRIPTION OF THE DRAWINGS

The process and the die in the present invention are illustrated in the accompanying drawings, in which.

FIGS. 2 and 3 show one embodiment of the die according to the present invention, in which, FIG. 2 is a front view of the die, and FIG. 3 is a section taken along III—III line in FIG. 2.

FIGS. 6 and 7 show a still another example of the die according to the present invention, in which, FIG. 6 is a front view of the die, and FIG. 7 is a sectional view of the die taken along VII—VII line of FIG. 6.

FIGS. 8 to 13 show yet further examples of the die according to the present invention, in which, FIGS. 8, 10 and 12 are front views of the respective dies, and FIGS. 9, 11 and 13 are sectional views of the dies, taken along IX—IX line of FIG. 8, taken along XI—XI line of FIG. 10, and taken along XIII—XIII line of FIG. 12, respectively.

DETAILED DESCRIPTION OF THE DRAWINGS

Figure 2:
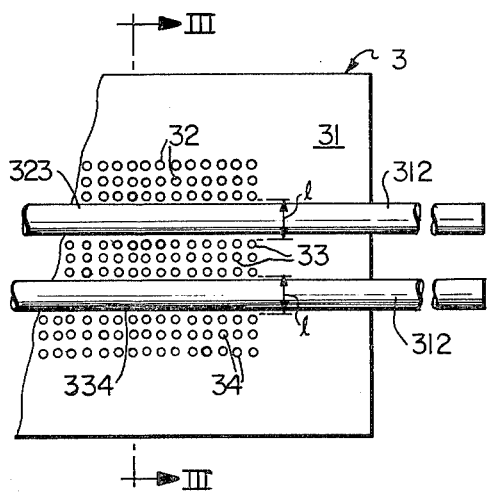
Figure 3:
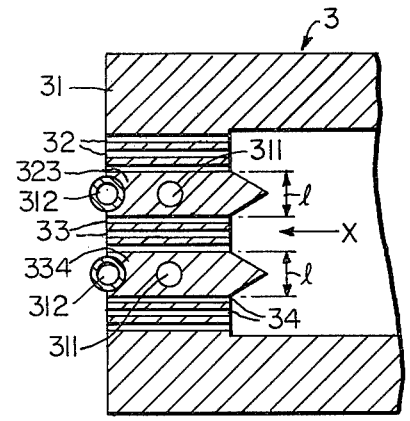

For convenience of explanation, the die according to the present invention is at first explained. FIGS. 2 and 3 show the die for use in preparing a board having a large width. In FIGS. 2 and 3, die 3 is provided with forward plate 31 at the forward end thereof. Forward plate 31 has a number of apertures 32 to 34 forming perforations therein. These apertures are distributed in the area corresponding to sectional shape of a desired product, and particularly the apertures in this die are distributed in a rectangular area. In the die, molten foamable resin is advanced in the direction indicated by arrow X.

In the die shown in FIGS. 2 and 3, a number of apertures 32 and 34 are completely separated into three thin layers, that is, a group of apertures 32, a group of apertures 33 and a group of apertures 34. More particularly, apertures 32 are arranged in three lines, one of which is located on another, to form a thin layer, a zone void of apertures is provided underneath the layer, apertures 33 are arranged further underneath the zone in three lines, one of which is located on another, to form a thin layer, a zone void of aperture is provided underneath the layer, and apertures 34 are further arranged underneath the zone in three lines, one of which is located on another, to form a layer.

Each of zones 323 and 334 extends in the lateral direction in FIG. 2, and both zones completely separate all the apertures into three groups. That is, both lateral ends of zones 323 and 334 are not interrupted by apertures 32 to 34, and extend to the position connecting the outermost apertures. Widths l of zones 323 and 334, that is, the lengths of the zones measured in the vertical direction in FIGS. 2 and 3, are almost the same, and more than twice the average distance between the adjacent apertures in each group.

In the die shown in FIGS. 2 and 3, forward plate 31 has passages 311 and 312 therein, which are for passing fluid, but not always required. In this instance, passages 311 are completely buried in forward plate 31, but passages 312 are located at the surface portion of forward plate 31 and a half of each passage 312 is exposed from the surface of forward plate 31. Passages 311 and 312 are located between apertures 32 and 33 and between apertures 33 and 34, respectively, and run in the direction perpendicular to that of apertures 32 to 34. These passages are used for cooling of zone 323 or 334 and to carry out partial cooling of forward plate 31.

Figure 1:
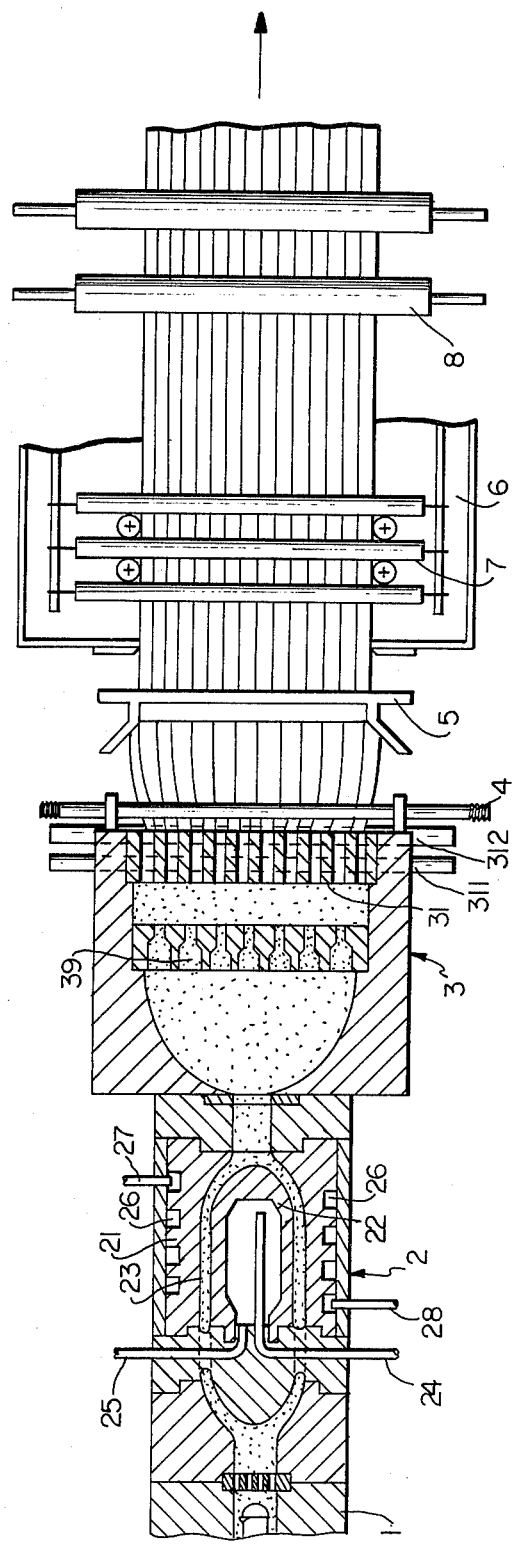
FIG. 1 shows one embodiment of a process according to the present invention together with an apparatus, partly in section, used therein.

One embodiment of the process according to the present invention is shown in FIG. 1. In FIG. 1, temperature regulator 2 is mounted on the forward end of extruder 1, and die 3 is mounted on the forward end of the temperature regulator 2. Die 3 is of a structure as shown in FIGS. 2 and 3. Guide pipes 4 are provided a little away from forward plate 31 in die 3. Guide pipes 4 serve to assemble a number of resin strands extruded from the apertures perforated in forward plate 31. Forming frame 5 is provided forward of guide pipes 4, cooling bath 6 is provided forward of forming frame 5, and transverse rolls 7 are provided in cooling bath 6. Forming frame 5 is for coalescing the resin strands. Transverse rolls 7 are for pressing the resin strands from the outside to adjust an entire shape and also for coalescing the resin strands to form an integrated article. Take-up rolls 8 are provided forward of the cooling bath for removing the integrated article.

In the process according to this invention, a die is used as shown in FIGS. 2 and 3, a foamable thermoplastic resin is extruded from the die to form a number of resin strands, which are coalesced as shown in FIG. 1. In the meantime, the foamable resin is extruded from each of apertures in the forward plate to form a number of resin strands. The apertures are arranged to form a plurality of groups, between which are provided zones void of apertures. Thus, the resin strands form a plurality of groups immediately after the resin strands have been extruded from the die, and vacant spaces are formed between the adjacent groups owing to non-existence of the resin strand in the zones which are void of apertures. Since each of the zones void of apertures has a width and extends through the area in which the apertures are distributed, each of the vacant spaces is formed to have a width. Thus, if the vacant spaces are to be eliminated later on by coalescence, each of the vacant spaces has some dimensions and is communicated with the air in the vicinity of the die. Thus, in this process, the vacant spaces can serve to release the gas generated from a foaming agent to the outside of the resin strands. After the excessive gas has been released, the resin strands are coalesced while the resin strands are still in a softened state, and thus the vacant spaces are eliminated to form an integrated article. As a result, all the resin strands are coalesced to obtain a foamed article.

In the process of the invention, a foamable resin is extruded to form a plurality of groups comprising a number of resin strands, wherein vacant spaces are formed between the adjacent groups and extend through the groups. Therefore gas and other fluids generated from the foaming agent can be released through the vacant spaces from the resin strands. Thereafter the groups of resin strands are coalesced to form the integrated article, and a hollow portion is prevented from forming in the article, although a hollow portion has frequently been formed by holding the gas in the article. Consequently, the process in the present invention produces a foamed article of considerable thickness having no hollow portions therein without any difficulty.

In the process shown in FIG. 1, when a cooling medium is circulated in passages 311 and 312 of the die shown in FIGS. 2 and 3, zones 323 and 334 are cooled to decrease the amount of the gas generated from the resin strands adjacent to the zones, and thus formation of a hollow portion can be prevented in the foamed article. Alternatively, exposed passages 312 may be provided with perforations in the exposing surface, and air and other fluid may be absorbed through the perforations so as to prevent the hollow portion from forming in the article.

In this invention, various thermoplastic resins can be used such as polystyrene, polyethylene, polypropylene and polyamides. Among the resins, polystyrene and styrene copolymer are most preferable. In order to make the resins foamable, a foaming agent must be added thereto. As the foaming agents, various compounds may be used, such as solid compounds which are decomposed by heating to generate gas, for example azodicarbonamide, and liquid or gaseous compounds which have boiling point lower than the softening point of the resins, and which have the characteristic that they can be impregnated in the resin and when heated evaporate in the resin such as, for example, propane and butane. When polystyrene is used for the resin, aliphatic hydrocarbons such as propane and butane are preferably used together with finely comminuted talc and the like. The foaming agent may be contained in the resin before the resin is fed into the extruder or may be employed in the extruder.

The die according to this invention is not limited to the die shown in FIGS. 2 and 3. The dies shown in FIGS. 4 to 13 can be used for the die according to the invention.

Figure 4:
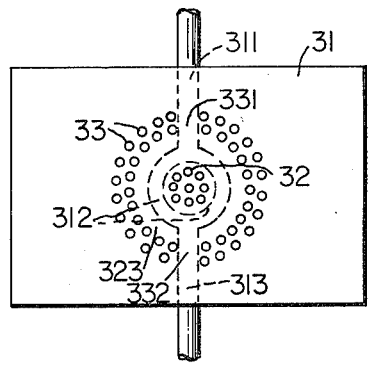
FIG. 4 is a front view of another example of the die according to the present invention.

FIG. 4 shows a die for use in preparing a bar of annular cross section having a large diameter. In the die in FIG. 4, forward plate 31 is provided with a number of apertures 32 and 33, which are distributed in an annular area. Zone 323 which is void of apertures is formed between inner apertures 32 and outer apertures 33, which are sharply separated by the zone 323. The zone 323 has a width more than twice the average distance between neighboring inner apertures 32 and more than twice the average distance between neighboring outer apertures 33. The zone 323 is connected with portions 331 and 332, which are void of apertures and communicated with the outside. Although it may appear that the portions 331 and 332 have a small width, this is due to the fact that the average distance is increased between outer apertures 33 compared with the inner apertures 32, and in fact, the width of portions 331 and 332 must be more than twice the average distance between neighboring outer apertures 33.

The die shown in FIG. 4 is provided with passages 311 and 313 for passing fluid. These passages are not exposed to the surface but buried in the die. More particularly, passage 311 begins from a pipe located at the upper side of forward plate 31, connected with annular passage 312 surrounding inner apertures 32, the annular passage further being connected with passage 313, which leads to a pipe located at the lower side of forward plate 31.

Figure 5:
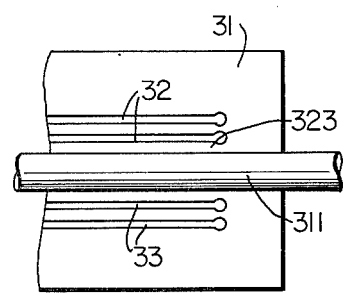
FIG. 5 is a front view of further another example of the die according to the present invention.

FIG. 5 shows a die for use in preparing a board of a considerable thickness. The die is provided with a number of slits 32 and 33 extending therethrough, and a zone 323 void of slits is formed between upper slits 32 and lower slits 33. The width or height of zone 323, that is, the width of the zone in vertical direction is more than twice the width between slits 32 or the width between slits 33. Passage 311 is provided in the zone 323 and a half tube constituting the passage is exposed in front of forward plate 31.

Figure 6:
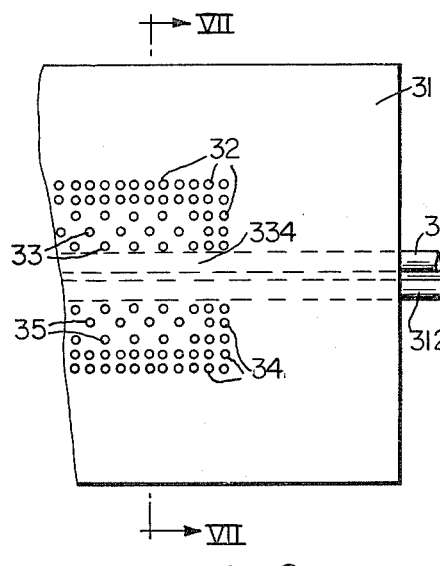
Figure 7:
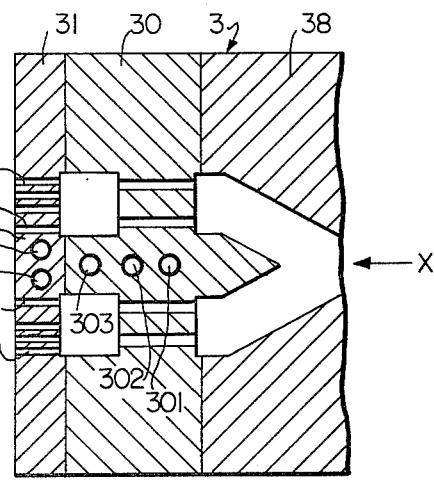

FIGS. 6 and 7 show a die for use in forming a board of a large thickness having a surface of great hardness. The die is provided with forward plate 31 as in the preceding dies, however, the die is different from the preceding dies in the respect that the die is provided with stream adjusting plate 30 on the back side of forward plate 31, and the die is provided with stream separating plate 38 on the back side of stream adjusting plate 30. Forward plate 31 is provided with a number of apertures 32 to 35 therein. As to the upper half portion of the forward plate, apertures 32 are located in the upper and outer portions and densely distributed while apertures 33 are located in the inner portion and thinly distributed. As to the lower half portion of the forward plate, it is likewise the said upper portion, and more particularly, apertures 34 which are densely distributed in the outer portion, while apertures 35 are thinly distributed in the inner portion. Zone 334 which is void of apertures is located between densely distributed apertures 33 and 35. Width of the zone, or in other words, the vertical height, is more than twice the distance between adjacent apertures 33 or 34.

In the die in FIGS. 6 and 7, passages 311 and 312 are formed in the zone 334 and a cooling medium may be passed into the passages. The passages are completely buried in the forward plate. Further, stream adjusting plate 30 is provided with passages 301 to 303, in which a cooling medium may also be passed.

FIGS. 8 and 9 show a die provided with passages 311 and 312, between which a number of apertures are located, and the passages are completely buried in forward plate 31.

FIGS. 10 and 11 show a die for preparing a square pillar of a large cross section. The die has therein a stream adjusting plate 39 in contact with forward plate 31, which comprises zones void of apertures, and the zones are provided with protrusions 323, 334 and 345 projecting both in the forward and backward directions and with passages 311, 312 and 313 perforated therein.

Figure 12:
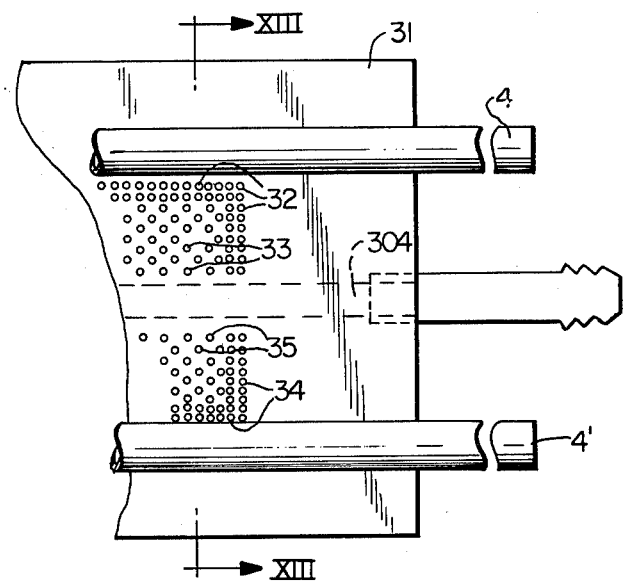
Figure 13:
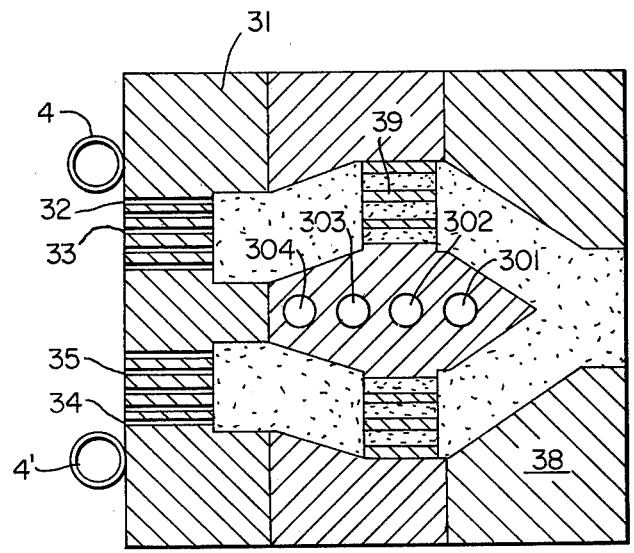

FIGS. 12 and 13 show a die comprising stream separating plate 38, stream adjusting plate 39 and forward plate 31, however, forward plate 31 is not provided with a passage for passing a cooling medium.

The die according to this invention must have a number of apertures, which should be separated into plural groups by at least a zone void of aperture, and the apertures belonging to the same group should be distributed in a narrow layer. The narrow layer referred to herein means that the thickness is less than approximately 20 mm. The zone void of aperture has preferably a uniform width throughout the zone. When a synthetic wood is intended to be obtained using polystyrene, the zone void of aperture has preferably a width between 10 mm and 30 mm.

The process according to this invention is not limited to the process wherein the die according to this invention is used. In other words, the process according to this invention can be carried out using known dies which are provided with a number of apertures uniformly distributed therein, however, but not provided with zone void of aperture. For example, the process according to this invention can be carried out by extruding a number of resin strands from apertures uniformly distributed in a die, inserting a pipe or pipes into the resin strands so that the pipe or pipes extend through the resin strands and the axis of the pipe is held in a direction perpendicular to the longitudinal direction of the resin strands, forming temporarily said vacant spaces between the resin strands by the pipe at the forward and backward positions of the pipe, and then coalescing the resin strands to form an integrated article.

When a cooling medium is circulated in the passage provided in the forward plate or stream adjusting plate of the die in the process according to this invention, a foamed article of large thickness can be obtained containing no hollow portion therein and having an excellent quality, as mentioned above. Oil or the air may be used for the cooling medium. It is not required that the flow of the medium be at a high rate. In case of oil, it will suffice to flow gently the oil at 80° to 120° C. When the passage is located at a depth surrounded by a number of apertures and the cooling medium is circulated in the passage, the resin strands extruded from the apertures located in the vicinity of the passage are decreased in foaming ratio, and give a foamed article having high density foamed strands therein. The article thus obtained is different from known foamed articles in the respect that the former is less brittle and tougher than the latter and is of superior quality.

According to the process in this invention, a foamed article having a large thickness but having no hollow portion can be obtained simply by extrusion and without difficulty, though a foamed article of large thickness cannot be obtained by the conventional extrusion processes without forming hollow portions in the article. When the article has the hollow portion therein, the article is of inferior quality, because the hollow portion is visible at cutting and spoils outside appearance of the article, decreases the water-resistance and increases water-absorbing ratio of the article, and also decreases bending strength, compressive strength and impact strength of the article. Thus, the conventional foamed article of large thickness could not be used in the applications wherein above strengths are required. In contrast, the article obtained according to this invention has no hollow portion therein, and can be used in applications wherein the conventional articles cannot be used, consequently expands the application fields whereto the article is applicable.

This invention will be explained in details hereinbelow by way of examples.

EXAMPLE 1

To 100 parts by weight of polystyrene were added 2 parts by weight of finely comminuted talc (foam adjusting agent) to form a mixture, which was fed into an extruder at the rate of 13 kg per hour. Butane was incorporated in the mixture in the extruder to form a foamable resin containing 2% by weight of butane.

A die was used as shown in FIGS. 2 and 3. The die was provided with forward plate 31, the particulars of which are as follows: Forward plate 31 has a thickness of 20 mm, was provided with apertures 32, 33 and 34 all of which had the diameter of 1.6 mm, and which were arranged at a distance of 2.5 mm in both the vertical and horizontal directions. More particularly, apertures 32 were arranged in every horizontal line by sixty one, and in three lines located one above another, and as a result, 183 apertures were provided in total. Apertures 33 and 34 were distributed in the same manner. Copper pipes 311 and 312 of 6 mm in diameter were provided by two at the distance of 10 mm in each of the spaces between apertures 32 and 33 and between apertures 33 and 34.

Upon extrusion, a heater was mounted on the outside of die 3 to maintain the die at about 150° C., and a large amount of the air at room temperature was circulated in copper pipes 311 and 312 to carry out partial cooling of forward plate 31. Foamable resin strands extruded from the apertures were passed through guide pipe 4 as shown in FIG. 1, then passed through forming frame 5, water bath 6, and rolls 7, and at last taken out by take-up rolls 8 at the rate of 29 cm per minute to obtain a foamed article having the thickness of 20 mm, width of 150 mm and density of 0.24 g/cc.

The foamed article did not contain hollow portion, though hollow portions are frequently formed between the surfaces of the contiguous resin strands in such thick article according to conventional process, and the article was uniformly and finely foamed. For comparison, an extrusion was carried out in which the air was not circulated in copper pipes 311 and 312. As a result, a foamed article was obtained having the thickness of 18 mm and including hollow portions in the central portion thereof.

EXAMPLE 2

This example was carried out in the same manner as in EXAMPLE 1, with the only exception being that, oil at 80° to 85° C. instead of the air was circulated in the copper pipes 311 and 312.

As a result, a foamed article of excellent quality was obtained having a thickness of 20 mm, width of 150 mm, density of 0.27 g/cc, and including high density layers in the central portion thereof, but no hollow portion therein.

EXAMPLE 3

As in the preceding examples, this example was carried out by adding 2 parts by weight of finely comminuted talc to 100 parts by weight of polystyrene to form a mixture, which was fed into an extruder. The extruder used herein was of a larger size than that used in Examples 1 and 2, and the mixture was fed therein at the rate of 90 kg per hour. Butane was used for the foaming agent, which was supplied to the mixture so that the mixture contained about 2% by weight of butane to form a foamable resin.

An apparatus was used which was the same as that shown in FIG. 1 with the exception of die 3. The die used herein was that shown in FIGS. 6 and 7. Particulars of the die used herein were as follows: In the die, as shown in FIG. 7, the resin after being passed through temperature regulator 2, was separated in plate 38 into two portions, each of which has a thickness of 30 mm, and width of 530 mm. Stream adjusting plate 30 was provided to contact with plate 38. Steam adjusting plate 30 had a thickness of 50 mm, in which a number of apertures were located in a zig-zag distribution, each of the apertures having a diameter of 6 mm and land length of 30 mm, and resin depots were formed forward of the apertures and had a length of 20 mm in the advancing direction. Pitches in the zig-zag distribution were 22 mm in the vertical direction and 12 mm in the horizontal direction. 131 apertures were provided forward of each of the upper and lower passages in stream separating plate 38, and the plate 30 had 262 apertures in total. Apart from the apertures, plate 30 had three passages 301 to 303, each of which had an inner diameter of 8 mm.

Forward plate 31 had a number of apertures 32 to 35 at the position connected with the resin depots in stream adjusting plate 30. As for the aperture distribution, apertures 32 and 34 were densely distributed in the outer portion, and apertures 33 and 35 were thinly distributed in the inner portion, as mentioned above. Among these apertures, apertures 32 had 1.8 mm in diameter, 20 mm in length in the advancing direction, were arranged in two lines at the distance of 2.5 mm in both height and width directions, and totalled 428. Apertures 34 were perforated in the same manner. Apertures 33 had 1.6 mm in diameter, 20 mm in length in the advancing direction, arranged in a zig-zag distribution wherein the pitches were 4 mm in the vertical direction and 4 mm in the horizontal direction, and totalled 1314. Apertures 35 were perforated in the same manner. As a result, forward plate 31 was provided with a total of 2628 apertures of 1.6 mm in diameter in the inner portion, and with 856 apertures of 1.8 mm in diameter in the outer portion.

Further, forward plate 31 was provided with zone 334, which was void of apertures and had a width of 30 mm. Zone 334 was provided with passages 311 and 312 for passing a cooling medium. The passages 311 and 312 had an inner diameter of 8 mm.

A heater was mounted on the outside of die 3 to maintain the outside of the die at 145° C., the air at room temperature was circulated in passages 301 to 303, 311 and 312 to carry out partial cooling of stream adjusting plate 30 and forward plate 31. Oil at 135° C. was circulated in pipes 24 and 27 of temperature regulator 2 to maintain the resin at a uniform temperature.

Thus the resin was extruded from apertures 32 to 35 of forward plate 31 to form a number of foamable resin strands, which were then passed through guide pipes 4, forming frame 5, water bath 6, rolls 7, and at last taken by take-up rolls 8 at a speed of 18 cm per minute. As a result, a foamed article was obtained having a thickness of 60 mm, the width of 490 mm, and the density of 0.28 g/cc.

The article was foamed uniformly, had fine foam, and did not contain any hollow portions therein.

For comparison, a comparative test was conducted, in which the same apparatus was used, but the air was not circulated in the passages 301 to 303, 311 and 312. Further, another comparative test was conducted in the same manner, with the exception that plate 38 was not used and the resin was immediately introduced into stream adjusting plate 30. These tests produced foamed articles, which were not of good quality, because they contained therein a number of hollow portions of about 1 to 2 mm in diameter.

EXAMPLE 4

100 parts by weight of polypropylene (manufactured by Mitsubish Yuka K.K. and sold as NOBLEN MH-8) were mixed with 10 parts by weight of ethylene-propylene copolymer (manufactured by Mitsui Sekiyu Kagaku K.K. and sold as TOUGHMER 0680) and 2 parts by weight of finely divided talc to form a mixture, which was fed into an extruder at the rate of 12 kg per hour. In the extruder, butane was incorporated into the mixture to form a foamable resin containing 3% by weight of butane.

A die was used which is shown in FIGS. 8 and 9. The die had zone 323, which was void of apertures, and in which a passage 311 was provided to be completely buried. Passages 312 were provided in the outside portion of each of apertures 32 and 33.

Further, though not shown in the drawings, throttles were provided in the resin passage of the die instead of stream adjusting plate 39, so as to adjust the resin stream in the horizontal direction.

Particulars of the die were as follows: Forward plate 31 had apertures 32 and 33, which had 10 mm in length, 1.6 mm in diameter, arranged at the distance of 3 mm in both vertical and horizontal directions. More particularly, apertures 32 were arranged in two horizontal lines, one above the other, each line comprising 48 apertures, and apertures 32 totalled 96. Apertures 33 were arranged in the same manner. Zone 323, which was void of apertures, was located between apertures 32 and apertures 33, and had a width of 8 mm. Underneath the zone 323 was buried passage 311 having the diameter of 6 mm. Passages 312 were buried in the symmetric portions of passage 311 with regard to apertures 32 and 33.

Upon extrusion, a heater was mounted on the sides of die 3 to maintain die 3 at 160° to 165° C., the air at room temperature was circulated in passages 311 and 312, especially a large amount of the air was circulated in passage 311 to cause sufficient cooling of forward plate 31. Foamable resin strands extruded from the apertures were coalesced as in Example 1 to obtain a foamed article having a thickness of 22 mm, width of 150 mm and density of 0.15 g/cc. The article did not contain any hollow portion therein, and was foamed uniformly.

EXAMPLE 5

100 parts by weight of polystyrene were mixed with 2 parts by weight of finely divided talc to form a mixture which was fed into an extruder. The extruder used herein was of a larger size than that used in Examples 1 and 2, and the mixture was fed into the extruder at the rate of 25 kg per hour. Butane was incorporated in the molten mixture in the extruder to form a foamable resin containing 2% by weight of butane.

A die was used which is shown in FIGS. 10 and 11. The die was provided with stream adjusting plate 39, particulars of which were as follows: Stream adjusting plate 39 had a portion in contact with the resin, which portion was a square of 160 mm in height and 160 mm in width, and provided with apertures 302. Apertures 302 had the diameter of 4.5 mm and the length of 50 mm, and apertures 302 were distributed at the distance of about 10 mm and totalled 193. Annular passage 301 was perforated in the central portion of the stream adjusting plate so as to avoid communicating with passage 302, and had an outside diameter of 70 mm, inside diameter of 50 mm and width of 25 mm. Annular passage 301 was connected with inlet passage and outlet passage leading to the outside.

A resin depot was provided forward of stream adjusting plate 39, had the length of 40 mm in the advancing direction, and was connected with a number of apertures in forward plate 31. Forward plate 31 comprised a square portion which was contacted with the resin and had a width of 160 mm, height of 160 mm, a number of apertures 32, 33, 34 and 35 which were densely distributed.

Among these apertures, apertures 32 had a diameter of 1.8 mm, length of 20 mm, and were distributed in such manner that 26 apertures were arranged in the horizontal direction, 7 apertures in the vertical direction, at the distance of 6 mm in the width direction and 5 mm in the height direction, and in the central portion surrounded by said apertures, 25 apertures were arranged in the horizontal direction, 6 apertures in the height direction in zig-zag distribution. Thus the apertures 32 totalled 332. Apertures 33, 34 and 35 were arranged in the same manner as apertures 32. As a result, forward plate 31 was provided with 1328 apertures and 3 zones, said apertures having the diameter of 1.8 mm, and said zones being void of apertures and having the width of 12 mm. Each of the zones was provided with a protrusion on each inlet and outlet side, the protrusion having a length of 20 mm. Each zone had therein three passages 311, 312, and 313 for circulating a cooling medium. Each of the passages 311, 312, and 313 had an inside diameter of 8 mm.

Upon extrusion, heaters were mounted on the outside of die 3 to maintain the die at 140° to 145° C., and the air at room temperature was circulated in the passages 301, 311, 312 and 313 to make partial cooling of stream adjusting plate 39 and forward plate 31. Oil at about 110° C. was circulated from pipes 24 and 27 in temperature regulator 2 to maintain the resin temperature uniform.

Under such conditions, the foamable resin was extruded and coalesced as in Example 1 to obtain a foamed article having the cross section of a rectangle with the thickness of about 120 mm, and width of about 150 mm, and having a density of 0.3 g/cc.

The article had strands intimately fused throughout the article, and did not contain any hollow portion therein.

EXAMPLE 6

2 parts by weight of finely divided talc was mixed with 100 parts by weight of polystyrene to form a mixture, which was then fed into an extruder at the rate of 160 kg per hour. Butane was incorporated into the molten mixture in the extruder to form a foamable resin containing 2% by weight of butane.

The apparatus was used as shown in FIG. 1, with only the exception that the die was used as shown in FIGS. 12 and 13 instead of the die 3 in FIG. 1.

Particulars of the die used herein were as follows: As shown in FIG. 13, stream separating plate 38 was mounted forward of temperature regulator 2. Steam separating plate 38 had two resin passages of 30 mm in thickness and 910 mm in width in the forward side thereof. Steam adjusting plate 39 was mounted in the forward side of stream separating plate 38. Stream adjusting plate 39 was provided with a number of apertures arranged in zig-zag form and with two resin depots, said apertures having the diameter of 6 mm, length of 50 mm in the advancing direction, and said resin depots having a length of 70 mm in the advancing direction and being located forward of the apertures. The resin depots were gradually decreased in height to have a height of 25 mm at the inlet of forward plate 31. The apertures were arranged with pitches of 9.5 mm in the vertical direction and 11 mm in the horizontal direction, and 278 total apertures were provided in front of each of the passages in plate 39, thus the apertures totalled 556. The stream adjusting plate 39 had a central portion provided with passages 301 to 304, each of which had the diameter of 10 mm.

Forward plate 31 had therein apertures 32 to 34, in which apertures 32 and 34 were densely distributed in the outer portions and apertures 33 and 35 were thinly distributed in the inner portions. All of said portions were located in front of the resin passage. More particularly, apertures 32 had diameters of 1.8 mm and lengths of 20 mm in the advancing direction, arranged in two lines, one above the other, with a distance of 2.5 mm both in the vertical direction and in the horizontal direction, and totalled 762. Apertures 34 were arranged in the same manner. Apertures 33 had the diameter of 1.6 mm and a length of 20 mm in the advancing direction, arranged in a zig-zag distribution with pitches of 5 mm both in the vertical and in the horizontal directions and totalled 1271. Apertures 35 were also arranged in the same manner.

Apertures 32 and 33 belonged to the same group, and apertures 34 and 35 belonged to another similar group. Zones void of apertures were located between these groups, and had a height of 20 mm. Thus, forward plate 31 had 2542 apertures of 1.6 mm in diameter located on the inside and 1524 apertures of 1.8 mm in diameter located on the outside.

Upon extrusion, heaters were mounted on the outside of the die to maintain the die surface at about 150° C., and oil at 125° C. was circulated in passages 301 to 304 to cause partial cooling of stream adjusting plate 39.

Under such conditions, the foamable resin were introduced into said die and extruded from apertures 32 to 35 of forward plate 31 to form foamed strands. Thereafter the strands were passed through guide pipe 4, forming frame 5, water bath 6, rolls 7 and taken out by take-up rolls 8 at the rate of 36 cm per minute. As a result, a foamed article was obtained having a thickness of 40 mm, width of 910 mm, and density of 0.2 g/cc.

The article was foamed to produce fine, uniform foams, with the foamed strands coalesced well, and was not observed to have any hollow portion therein.

What is claimed is:

1. A process for preparing a foamed article from extruded strands of thermoplastic resin, said article being free from holes between coalesced strands therein and having a thickness of more than 20 mm, comprising extruding a molten foamable thermoplastic resin through a die having a resin discharge plate provided with a plurality of rows of a plurality of apertures, said resin discharge plate having said apertures located on the same plane of the surface thereof, the rows of apertures being such that all the extruded resin strands are divided, immediately after the resin strands have left the resin discharge face, into a plurality of groups, each group having a thickness of less than 20 mm to form a space therebetween corresponding to a zone void of apertures of the resin discharge plate and being communicated with the ambient atmosphere, said zone void of apertures being of a thickness more than twice the average distance between two adjacent apertures belonging to the same group, and being provided therein with a closed passage for passing a cooling medium therethrough in a direction perpendicular to said apertures to cool the zone; and coalescing thereafter the resin strands to form an integrated article more than 20 mm thick, while the strands are still in a softened state.

2. In a die employed for preparing a foamed article of thermoplastic resin wherein a number of apertures are provided in the resin discharge face of the die, said apertures being located on the same plane of the surface of the resin discharge face distributed in a shape corresponding to the cross section of the desired article, the improvement which comprises dividing the apertures into a plurality of groups by at least one zone void of apertures so that the apertures belonging to the same group are restricted within a narrow band area having a thickness of less than 20 mm, the zone void of apertures being of a thickness more than twice the average distance between two adjacent apertures belonging to the same group, and said at least one zone being provided therein with a closed passage for passing a cooling medium through said zone in a direction perpendicular to said apertures to cool the zone, both ends of the zone being extended to a line connecting the outermost apertures.

* * * * *